No. 832,743. PATENTED OCT. 9, 1906.
F. W. NOLTE.
EYEGLASSES.
APPLICATION FILED AUG. 28, 1905.
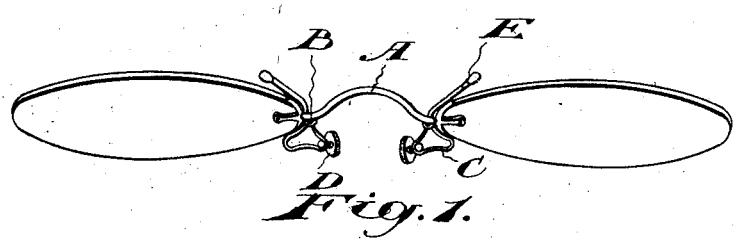
Fig. 1.
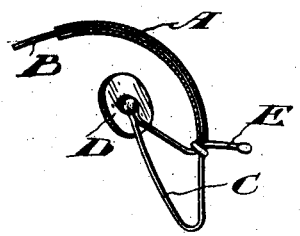
Fig. 2.
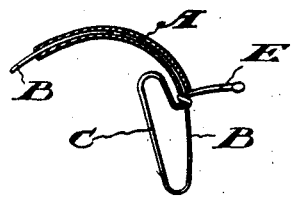
Fig. 3.
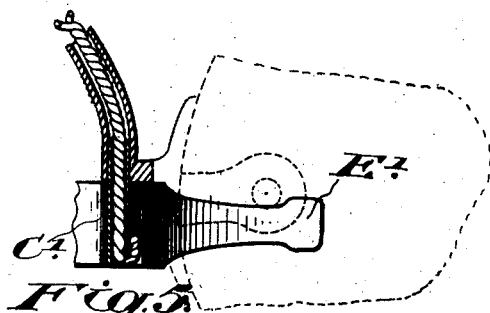
Fig. 5.
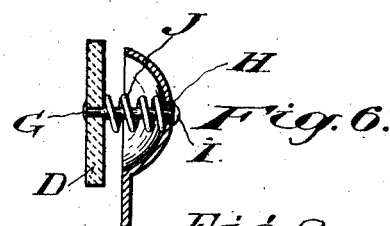
Fig. 6.
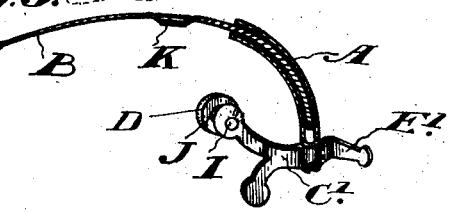
Fig. 4.
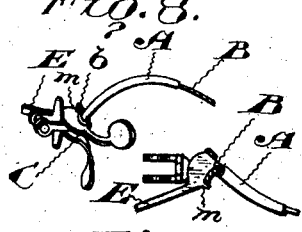
Fig. 8.
Fig. 7.
WITNESSES:
INVENTOR.
F. W. Nolte
BY
ATTORNEYS

UNITED STATES PATENT OFFICE.

FREDERICK WILLIAM NOLTE, OF VICTORIA, BRITISH COLUMBIA, CANADA.

EYEGLASSES.

No. 832,743.      Specification of Letters Patent.      Patented Oct. 9, 1906.

Application filed August 28, 1905. Serial No. 276,104.

*To all whom it may concern:*

Be it known that I, FREDERICK WILLIAM NOLTE, of the city of Victoria, in the Province of British Columbia, Canada, have invented certain new and useful Improvements in Eyeglasses, of which the following is a specification.

The object of my invention is to devise eyeglasses which look neat and light and which will hold on the nose without undue pressure; and it consists, essentially, in forming the eyeglasses with a hollow bridge, within which is held a wire, and in connecting the guards or nose-pieces to this wire in such a manner that they will grip the nose with a spring action, substantially as hereinafter more specifically described and then definitely claimed.

Figure 1 is a perspective view showing a pair of glasses eye constructed in accordance with my invention. Fig. 2 is a perspective view showing one of the nose-pieces and the bridge in section. Fig. 3 is a similar view showing a slight modification of the invention. Fig. 4 is a similar view showing another modification. Fig. 5 is a sectional detail, on an enlarged scale, showing the journaling of the nose-piece shown in Fig. 4. Fig. 6 is an enlarged sectional detail showing the spring-cushion. Figs. 7 and 8 are detail views of nose-piece, showing preferable way of attaching torsional wire.

In the drawings like letters of reference indicate corresponding parts in the different figures.

Referring particularly to Fig. 1, which shows rimless eyeglasses, A is a bridge secured to the eyeglasses in any ordinary well-known manner. The invention is, however, equally applicable to framed glasses.

The bridge is hollow, as shown more particularly in Figs. 2, 3, 4, and 5. In the bridge is secured a wire B. This wire may continue right through the bridge, as shown in Figs. 2 and 4, or separate wires may be used, as shown in Fig. 3. If the wire be a close fit within the bridge, the friction will be quite sufficient to hold the wires in place, though the ends may easily be soldered or otherwise secured within the bridge. The outer end of each wire B is bent to form the nose-piece C, extending rearwardly from the bridge. This nose-piece may be a simple flattened loop, such as shown in Fig. 3, or roughly triangular in shape and provided with a cushion D, as shown in Fig. 2. The end of the wire is twisted round the main portion adjacent to the bridge and extended forward to form a grip E, the ends of the grips being preferably rounded or otherwise finished off, as shown. These outwardly-extending grips may be grasped by the fingers to spread the nose-piece apart when it is desired to place the eyeglasses on the nose. The torsional spring of the wire B and the spring in the nose-pieces tend to press the guards inwardly to grip the nose, and they do this with an effective elastic pressure, which makes the eyeglasses quite secure, while very comfortable to the wearer. To increase the torsional spring of the wire, it may be doubled, as shown in Fig. 4, and the parts twisted together with a right-hand twist from the center to one end and with a left-hand twist from the center toward the other end, so that the torsion is in diverse directions at the opposite sides of the bridge.

With the increased spring obtained by doubling and twisting the wire B, I find that I can dispense with any spring in the nose-guard, and may therefore employ the stiff nose-piece C' shown in Fig. 4. This nose-piece, it will be seen, is provided with a hollow journal within the lower end of the bridge. Through this hollow journal the wire is passed, and is suitably secured therein by soldering or otherwise.

In Figs. 4 and 5 I show a simple method, the wire having its end bent into a notch in the nose-piece after having been passed through the journal. I find a good method of holding the twisted wire in the bridge is to fit in the loop left at the center where the change in twist is made a small plate K. This plate fitting tightly in the bridge cannot turn therein, and thus full advantage may be obtained of the torsion of each half of the wire. The grip E' is integral with the nose-piece C'. The cushion D may also be employed with this nose-piece, as shown.

In Fig. 6 I show in detail the preferable construction of the cushion shown in Figs. 2 and 4. The cushion is secured to the inner end of a pin G, which is passed through a loose hole H in the nose-guard and is provided with a head I of greater size than the hole H. On the pin, between the nose-piece and the cushion, is placed a fine coil-spring J, which tends to retain the cushion in the position shown; but owing to the loose connection with the nose-piece and the yielding action of the spring the cushion will readily adapt itself to the surface of the nose, yet tends always to assume its normal position when released.

In order that a long coil-spring may be employed, with its consequent advantages, I prefer to cup or recess the nose-piece, as shown Fig. 6, or otherwise bring the aperture for the pin below or back of the general surface of the end of the nose-piece.

Eyeglasses constructed in accordance with my invention are easily constructed, very effective in use, and adapt themselves readily to the various shapes of noses with which they are employed.

In Fig. 8 I show a preferred form of solid nose-piece. It is provided with a shoulder m, at which through a hole is inserted and fastened the end of the torsional spring-wire B, which passes through the bridge A. This end is bent at an angle to the spring-wire in the bridge, as is clearly shown in the upside-down view to the right in Fig. 8. In the view to the left the fastened end of the wire at the shoulder is indicated at b. This mode of fastening the end of the spring-wire to the nose-piece affords a good grip on the nose.

What I claim as my invention is—

1. In eyeglasses a hollow bridge; a wire forming a spring, and rigidly held at one end within the bridge; and a nose-piece connected with the wire, substantially as described.

2. In eyeglasses a hollow bridge; two wires twisted together and held within the bridge, and a nose-piece connected with the outer end of the doubled wire, substantially as described.

3. In eyeglasses a hollow bridge; a wire held firmly at one end within the bridge and a nose-piece connected with the wire extending rearwardly and a finger-grip extending forwardly, substantially as described.

4. In eyeglasses a hollow bridge, two wires twisted together and held firmly at one end within the bridge, and a nose-piece connected with the outer end of the doubled wire extending rearwardly and a finger-grip extending forwardly substantially as described.

5. In eyeglasses a hollow bridge, a wire held firmly at one end within the bridge, and a nose-piece connected with the outer end of the wire and vertically journaled on the lower end of the bridge, substantially as described.

6. In eyeglasses a hollow bridge, two wires twisted together and held firmly at one end within the bridge, and a nose-piece connected with the outer end of the doubled wire and vertically journaled on the lower end of the bridge, substantially as described.

7. In eyeglasses a hollow bridge, a wire held firmly at one end within the bridge, and a nose-piece connected with the outer end of the wire; a journal on the nose-piece having a bearing within the lower end of the bridge, substantially as described.

8. In eyeglasses a hollow bridge, a wire held firmly at one end within the bridge, a nose-piece connected with the outer end of the wire, a hollow journal on the nose-piece having a bearing within the lower end of the bridge, the wire being secured within the hollow journal, substantially as described.

9. In eyeglasses a hollow bridge; two wires twisted from the middle to one end with a right-hand twist and from the middle to the other end with a left-hand twist and rigidly held at its middle within the bridge; and a nose-piece connected with each of the outer ends of the doubled wire, substantially as described.

10. In eyeglasses the combination of hollow bridge A, spring-wire B, nose-piece C provided with shoulder m, the end of the spring-wire being bent at an angle and fastened at b near the shoulder, as described.

11. In eyeglasses a hollow bridge; nose-pieces vertically journaled at the lower ends of the bridge; a torsion spring-wire held within the bridge and engaging the nose-pieces to impart a spring action thereto, substantially as described.

Victoria, British Columbia, August 16, 1905.

FREDERICK WILLIAM NOLTE.

In presence of—
B. S. HEISTERMAN,
GEO. D. DICKINSON.